United States Patent [19]
Takeichi et al.

[11] Patent Number: 4,966,082
[45] Date of Patent: Oct. 30, 1990

[54] CONSTRUCTION AND A MANUFACTURING METHOD OF UNDERFRAME FOR A ROLLING STOCK

[75] Inventors: Michifumi Takeichi; Hisashi Tani; Katsuyuki Terada; Takeyuki Watanabe; Sumio Okuno; Masayuki Dogen, all of Kudamatsu, Japan

[73] Assignees: Hitachi, Ltd., Tokyo; Kasado Kikai Co., Ltd., Yamaguchi, both of Japan

[21] Appl. No.: 258,590

[22] Filed: Oct. 17, 1988

[30] Foreign Application Priority Data

Oct. 21, 1987 [JP] Japan ............................ 62-263907
Mar. 11, 1988 [JP] Japan ............................ 63-56090

[51] Int. Cl.[5] ............................ B62P 33/02
[52] U.S. Cl. ............................ 105/422; 296/204; 52/799
[58] Field of Search ............................ 105/422, 375; 52/799, 52/801; 428/603, 182, 186; 296/204

[56] References Cited

U.S. PATENT DOCUMENTS

| | | | |
|---|---|---|---|
| 1,867,433 | 7/1932 | Young | 105/422 |
| 1,974,665 | 9/1934 | Schnetzer et al. | 52/799 X |
| 2,384,157 | 9/1945 | Burke | 428/603 X |
| 2,801,597 | 8/1957 | Ecoff | 105/422 X |
| 3,321,826 | 5/1967 | Lang | 52/799 X |
| 4,645,258 | 2/1987 | Ohmura et al. | 105/422 X |

*Primary Examiner*—Andres Kashnikow
*Assistant Examiner*—Kevin P. Weldon
*Attorney, Agent, or Firm*—Antonelli, Terry, Stout & Kraus

[57] ABSTRACT

An rolling stock underframe construction comprising longitudinal side sills, end sills connecting opposite longitudinal ends of one side sills to opposite longitudinal ends of the other side sill, body bolsters respectively disposed at positions corresponding to trucks, and center sills extending between the end sills and the corresponding body bolsters in parallel to the side sills; and a floor member fixedly disposed in an area defined by the side sills and the end sills. The floor member comprises an upper plate forming, a lower plate forming, and a corrugated plate disposed between the upper plate and lower plate. The corrugated plate includes an alternate arrangement of ridges and longitudinal furrows and is joined to both the upper and lower plate. The floor member has weight and thickness smaller than those to join the floor member side sills, and body bolsters, an assembly of the corrugated and the upper plate or lower plate is joined to the side sills and the body bolsters, and then the lower or upper plate is joined to the corrugated plate, the side sills and the body bolsters, so that the floor member is joined firmly to the side sills and the body bolsters.

19 Claims, 5 Drawing Sheets

CONSTRUCTION AND A MANUFACTURING METHOD OF UNDERFRAME FOR A ROLLING STOCK

BACKGROUND OF THE INVENTION

1. Field of the Invention

The present invention relates to an underframe of a body for a rolling stock and a method of manufacturing the same and, more particularly, to a method and an underframe construction for a rolling stock having equipment disposed beneath the underframe.

2. Description of the Prior Art

In, for example, "Rolling Stock Technology 159", A Japanese Association of Rolling Stock Industry, 29, (Sept., 1982) an underframe construction is proposed wherein, as shown in FIGS. 14–17, a body of a rolling stock comprises side frame means 1 for forming opposite side walls, a roof frame means 2 for forming a roof, an underframe means 3 for forming a floor or support, and end frame means 4 for forming longitudinal end walls.

As shown most clearly in FIG. 15, the underframe 3 includes longitudinally extending side sills 5 disposed on opposite sides of the underframe 3, end sills 9 connecting the corresponding opposite ends of the side sills 5, body bolsters 8 respectively placed at positions corresponding to trucks of the rolling stock, center sills 10 extending between the body bolsters 8 and the corresponding end sills 9, cross beams 6 extending between the side sills 5 and parallel to the body bolsters 8 at equal intervals, and a corrugated plate 7 placed on the upper surface of the Another underframe construction has been proposed which includes extruded shapes of a hollow truss construction formed of an aluminum alloy arranged across the underframe and joined to the side sills.

Moreover, U.S. Pat. No. 4,645,258 proposes an underframe comprising side sills, and members having a box-shaped cross section placed contiguously in parallel to the side sills.

In the underframe illustrated in FIG. 16, the vertical size of the cross beams 6 must be large to bear vertical load and, consequently, the vertical size of the underframe is increased. Accordingly, the height of the passenger cabin must be reduced or a space for accommodating necessary equipment beneath the underframe must be reduced. Since the cross beams 6 must have a sufficient strength, the cross beams 6 are formed of a channel or comparatively thick plate in a ⊐-shaped cross section as shown in FIG. 17 and, consequently, the cross beams 6 are comparatively heavy.

On the other hand, the material cost of the underframe comprising extruded shapes formed of an aluminum alloy is high as compared with that of the steel underframe. Furthermore, since new extruded shapes must be prepared every time the specifications of the underframe are changed, additional costs are incurred for preparing new dies. Furthermore, an underframe consisting mainly of members formed of an aluminum alloy is susceptible to heat, and hence the underframe must be provided with heat insulating members to improve fire resistance.

Moreover, in an underframe comprising members having a box-shaped cross section contiguously placed longitudinally between the side sills, a longitudinal load, namely, a tractive force, is transmitted by the side sills, and hence the side sills must be sufficiently strong. Accordingly, such an underframe comprises heavy side sills, which increases the weight of the underframe.

SUMMARY OF THE INVENTION

Accordingly, it is an object of the present invention to provide a lightweight underframe construction for a rolling stock and a method of manufacturing the underframe construction.

Another object of the present invention resides in providing an underframe construction having a comparatively small height.

Yet another object of the present invention resides in providing a method of manufacturing an underframe for a rolling stock enabling a mass production of the underframe construction.

In accordance with advantageous features of the present invention, an underframe construction is provided which includes longitudinally extending side sills, end sills connecting corresponding opposite sides of the side sills, body bolsters respectively disposed at positions corresponding to trucks of the rolling stock, center sills extending between end sills and the corresponding body bolsters in parallel to the side sills, and a floor or support member disposed on a plane defined by the side sills and the end sills. The floor member comprises an upper plate means for forming an upper surface of the floor member, a lower plate means for forming a lower surface of the floor member, and a corrugated plate disposed between the upper plate and lower plate. The corrugated plate includes ridges extending parallel to the side sills and arranged at intervals in a direction perpendicular to the side sills, with the corrugated plate being fixedly joined to both the upper and lower plate means.

In accordance with another aspect of the present invention, a method of manufacturing an underframe construction is proposed which is comprised of: assembly longitudinally extended side sills, end sills for connecting the side sills at the corresponding opposite ends thereof, body bolsters disposed respectively at positions corresponding to trucks, and center sills beams extended between the end sills and the corresponding body bolsters; disposing a floor member consisting of an upper plate, a lower plate and a corrugated plate on a surface defined by the side sills and the body bolsters; joining the side edges of the floor member to the corresponding side sills; and joining the longitudinally opposite ends of the floor member to the corrugated plate.

DESCRIPTION OF THE PREFERRED EMBODIMENTS

Figure 1:
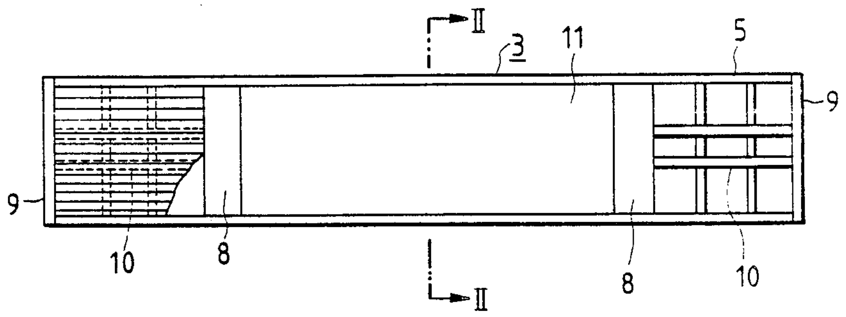
FIG. 1 is a plan view of an underframe construction in accordance with a first embodiment the present invention.
Figure 2:
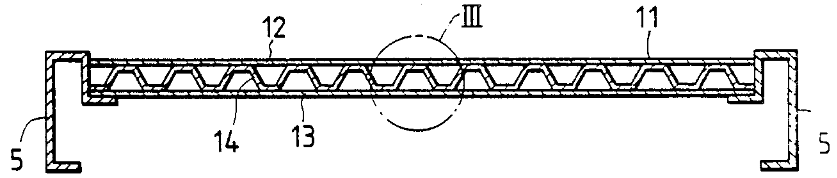
FIG. 2 is a cross sectional view taken along the line II—II in FIG. 1.
Figure 3:
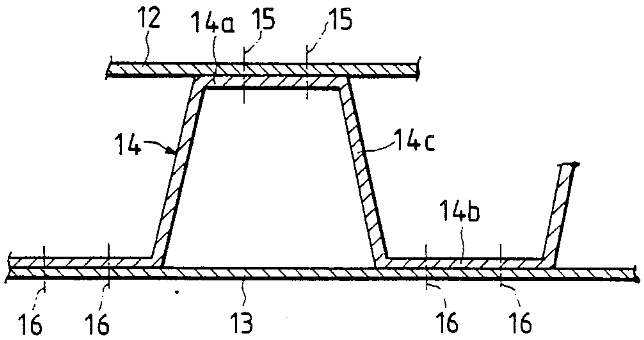
FIG. 3 is an enlarged cross sectional detail view of a portion III in FIG. 2.

Referring now to the drawings wherein like reference numerals are used throughout the various views to designate like parts and, more particularly, to FIGS. 1–3, according to these figures, an underframe 3 is provided with a floor member 11 disposed in an area enclosed by side sills 5 extending longitudinally of the underframe 3, a plurality of longitudinally spaced body bolsters 8. As shown most clearly in FIG. 2, the member 11 comprises an upper plate 12 forming an upper surface of the floor member 11, a lower plate 13 forming the lower surface of the floor member 11, and a corrugated plate 14 disposed between the upper plate 12 and the lower plate 13. The upper plate 12, the lower plate 13, and the corrugated plate 14 are formed of a thin stainless steel plate or a thin high-tensile strength steel plate.

As shown most clearly in FIG. 3, the plate 14 includes longitudinally extending ridges arranged transversely of the underframe 3 and having a corrugated cross-section. The corrugated plate 14 is spot-welded at spots 15 on upper walls 14*a* of the ridges thereof to a lower surface of the upper plate 12 and is spot welded at spot 16 on lower walls 14*b* of the furrows thereof to the upper surface of the lower plate 13. Generally, the inclination of the side walls of ridges extending between the upper walls 14*a* and lower walls 14*b*, namely, the webs 14*c* is at an angle of 45°. The inclination of the webs 14*c* may be selectively determined taking into consideration a vertical load or horizontal load which will act on the floor member 11.

The corrugated plate 14 may be joined to the upper plate 12 and the lower plate by joining means other than spot welding, such as plug welding, bolts and nuts, rivets or an adhesive. That is, the corrugated plate 14 may be joined to the upper plate 12 and the lower plate 13 by any suitable joining means capable of fixedly joining the upper corrugated plate 14 to the upper plate 12 and the lower plate 13.

When the floor member 11 thus formed by fixedly joining together the upper plate 12, the lower plate 13 and the corrugated plate 14 is placed in an area enclosed by the side sills 5 and the body bolsters 8 and is joined to the side sills 5 and the body bolsters 8, the upper plate 12 and the lower plate 13 of the floor member 11 are joined to the side sills 5 and the body bolsters 8, while the corrugated plate 14 is joined to neither the side sills 5 nor the body bolsters 8. Therefore, the lower plate 13 and the corrugated plate 14 are joined together, the assembly of the lower plate 13 and the corrugated plate 14 is placed in the area defined by the side sills 5 and the body bolsters 8, the lower plate 13 and the corrugated plate 14 are joined to the side sills 5 and the body bolsters 8, the upper plate 12 is placed on the corrugated plate 14, and then the upper plate 12 is welded to the side sills 5, the body bolsters 8 and the corrugated plate 14, whereby the floor member 11 is joined perfectly to the side sills 5 and the body bolsters 8.

In fabricating the floor member 11, it is advantageous with respect to both strength and manufacturing processes to assemble the upper plate 12, the lower plate 13 and the corrugated plate 14 each in a single piece. However, the upper plate 12, the lower plate 13 and the corrugated plate 14 each have a width in the range of 2 to 3 m and a length not less than 10 m, and thin plates for forming the upper plate 12, the lower plate 13 and the corrugated plate 14 each in a single piece are not available. Accordingly, the upper plate 12, the lower plate 13 and the corrugated plate 14 are fabricated by joining together a plurality of narrow plates arranged transversely. In assembling the floor member 11, the upper plate 12, the lower plate 13 and the corrugated plate 14 are arranged so that the respective joints of the upper plate 12, the lower plate 13 and the corrugated plate 14 are dislocated relative to those of other plates to avoid the reduction in strength of the floor member 11 due to the coincidence of the joints of the upper plate 12, the lower plate 13 and the corrugated plate 14.

Thus, the employment of the floor member 11 consisting of members formed of thin plates instead of heavy cross beams enables the underframe 3 to be formed to have a lightweight construction. Furthermore, forming by fixedly joining together the upper plate 12, the lower plate 13 and the corrugated plate 14 results in a trussed structure, the floor member 11 has a sufficient strength even though the upper plate 12, the lower plate 13 and the corrugated plate 14 are formed of thin plates, which also contributes to forming the underframe 3 in a lightweight construction. Furthermore, the floor member 11 is capable of bearing a vertical load including the weight of the passengers and outfit of the rolling stock and the weight of the under-floor equipment, and an axial load, such as a tractive force. Accordingly, the vertical size, namely, the thickness, of the floor member 11 may be smaller than that of the conventional underframe consisting of cross beams bearing a vertical load, and a corrugated plate 14 bearing an axial load, and hence the floor member 11 enables the height of the passenger cabin or that of the space for accommodating the under-floor equipment to be increased.

Since the floor member 11 comprises the upper plate 12, the lower plate 13, and the corrugated plate 14 formed by bending a thin plate, the material cost of the underframe 3 employing the floor member 11 is less than the material cost of the underframe comprising extruded shapes of an aluminum alloy.

Furthermore, since the floor member 11 is capable of bearing both the vertical load and the axial load, the strength of the side sills 5 may be less than the strength of the side sills of the conventional underframe comprising members having a box-shaped cross section and arranged longitudinally of the body one after another of the body. Thus, the lightweight side sills 5 enables the underframe 3 to be formed of a lightweight construction.

Although the floor member 11 of the underframe 3 in the embodiment of FIGS. 1–3 is disposed in an area enclosed by the side sills 5 and the body bolsters 8, the floor member 11 may be disposed in an area enclosed by the side sills 5 and the end sills 9. That may be the floor member 11 is formed of a length corresponding to a distance between the inner side walls of the end sills 9 to form the entire surface of the underframe 3 by the floor member. When such a floor member 11 is employed, the body bolsters 8 and the center sills 10 are attached to the lower surface of the floor member 11. In the underframe thus constructed, the opposite end portions extending outside the body bolsters 8 of the underframe 3 are formed mainly of portions of the floor member 11, the short cross-beams 6a extended between the center sills 10 and the side sills 5 may be omitted, thereby supporting construction of the underframe.

In the floor member 11, the strength of the joints between the lower plate 13 and the bottom walls 14b of the furrows of the corrugated plate 14 is higher than that of other portions on the lower plate 13 and, particularly, the strength of portions of the joints near the webs 14c is the highest, provided that the weld spots 16 are near the webs 14c of the corrugated plate 14. Accordingly, supporting members for supporting the underfloor equipment are attached to the floor member 11 in portions on the lower surface of the lower plate 13 in a vicinity of the joints between the lower plate 13 and the bottom wall 14b of the furrows of the corrugated plate 14 and, particularly, at positions corresponding to the webs 14c of the corrugated plate 14. That is, it is most effective to attach the supporting members to the lower surface of the floor member 11 at the positions near the webs 14c in the joints between the lower plate 13 and the bottom walls 14b of the corrugated plate 14.

Figure 4:
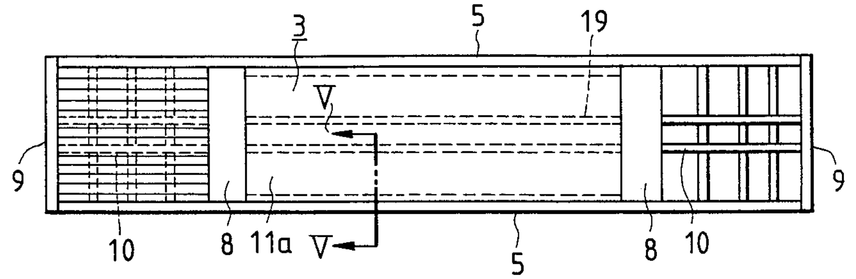
FIG. 4 is a plan view of an underframe construction in accordance with a second embodiment the present invention.
Figure 5:
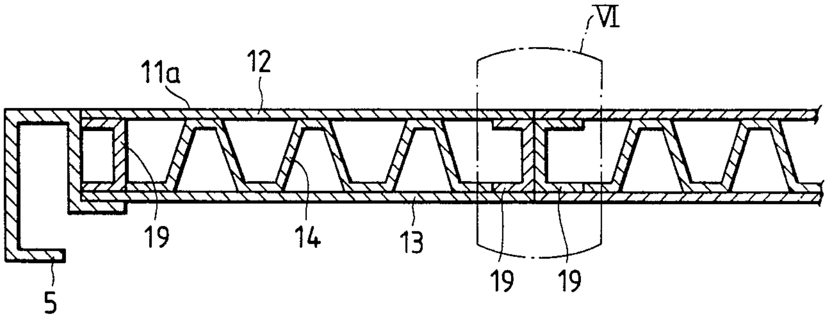
FIG. 5 is a cross sectional view taken along the line V—V in FIG. 4.
Figure 6:
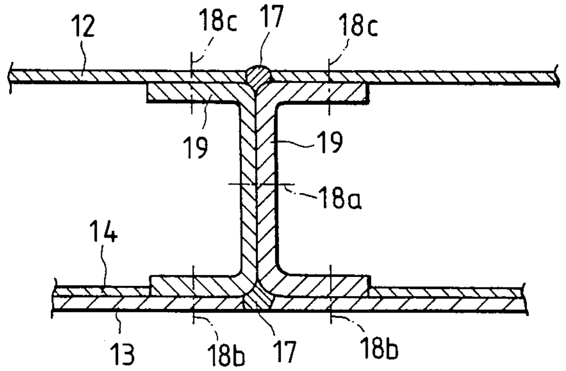
FIG. 6 is an enlarged sectional detail view of a portion VI in FIG. 5.

In the embodiment of FIGS. 4–6, underframe 3 is provided with floor members 11a arranged contiguously along the width thereof with a width of the floor members 11a being smaller than a width of the floor member 11. Each floor block 11a, similarly to the floor member 11, comprises an upper plate 12, a lower plate 13 and a corrugated plate 14, with the respective widths of the upper plate 12, the lower plate 13 and the corrugated plate 14 being smaller than a width of the floor member 11. The floor block 11a is different from the floor member 11 in that the floor member 11a is provided with side beams 19 disposed between the upper plate 12 and the lower plate 13 respectively along the opposite sides of the corrugated plate 14. The side beams 19 has a channel or -shaped cross section and extends longitudinally of the underframe 3. As shown in FIG. 6 adjacent floor members 11a are joined together by spot-welding adjacent webs of the side beams 19 at weld spots 18a, and welding the adjacent side edges of the upper plates 12, the adjacent upper edges of the webs of the side beams 19, the adjacent side edges of the lower plate 13, and the adjacent lower edges of the webs of the side beams 19 at weld pats 17. In joining together the floor members 11a, assemblies each of the lower plate 13, the corrugated plate 14 and the side beams 19 are placed with the webs of the side beams 19 positioned in contact with each other, the side beams 19 of the assemblies are spot-welded at the weld spots 18a, the lower plates 13 and the lower edges of the webs of the side beams 19 of the assemblies are welded at the weld pats 17, the upper plates 12 are spot-welded at the upper flanges of the side beams 19, respectively, at weld spots 18c, and then the side edges of the upper plates 12 and the upper edges of the webs of the side beams are welded at the weld parts 17. The lower plate 13 is spot-welded to the lower flanges of the side beams 19 at weld spots 18b. It is also possible to join the adjacent floor members 11a together by first placing assemblies each of the upper plate 12, the corrugated plate 14 and the side beams contiguously, joining together the assemblies, and attaching the lower plates 13 respectively to the assemblies. The outermost member 11a is joined to the side sill 5 by plug-welding the edge portion of the lower plate 13 and the lower flange of the side beam 19 to the supporting flange of the side sill 5.

In the underframe 3 thus constructed, since the side beams 19 extend longitudinally between the front and rear body bolsters 8, the underframe 3 has an increased number of supporting points along the width thereof. While the floor member 11 of the embodiment of FIGS. 1–3 is supported on the side sills 5 along the opposite sides thereof, the floor members 11a each having the side beams 19 along the opposite sides thereof have an increased supporting points along the width of the underframe 3, and the intervals between the adjacent supporting points are small. Accordingly, compressive stress and tensile stress induced in the upper plates 12 and the lower plates 13 of the floor members 11a are reduced. Furthermore, bending moment acting transversely on the floor members 11a also is reduced and longitudinal stress induced in the underframe 3 can be distributed.

Figure 7:
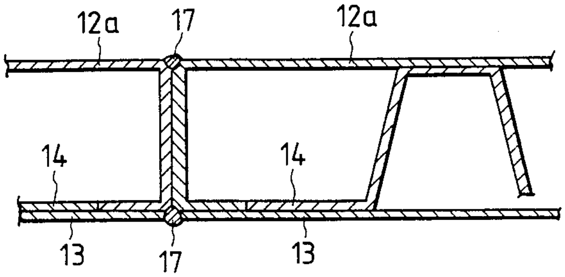
FIGS. 7 to 11 are enlarged cross sectional detail views of modifications of the underframe construction of FIG. 4.

In the modification shown in FIG. 7, the side portions of a plate forming an upper plate 12a and having a width greater than that of the upper plate 12 are bent vertically downward and horizontally to form channel-shaped portions, the function of which, is the same as that of the side beams 19 of the floor member 11a.

Figure 8:
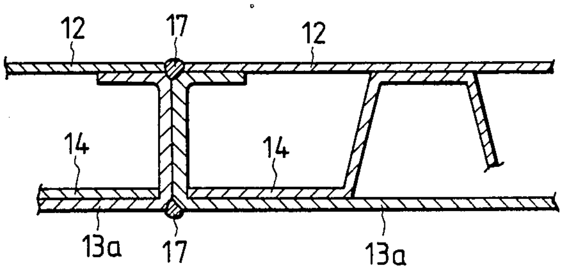

In the modification shown in FIG. 8, the side portions of a plate forming a lower plate 13a and having a width greater than a width of the lower plate 13 of the floor member 13a are bent vertically upward and horizontally to form channel-shaped portions, the function of which is the same as that of the side beams 19 of the floor member 11a.

Figure 9:
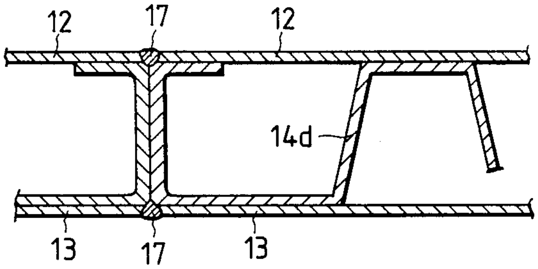

In the modification shown in FIG. 9, the side portions of a plate forming a corrugated plate 14 and having a width greater than a width of the corrugated plate 14 of the floor member 11a are bent vertically upward and horizontally to form a channel-shaped portions, the function of which is the same as that of the side beams 19 of the floor member 11a.

In the modifications shown in FIGS. 7, 8 and 9, the upper plate 12a, the lower plate 13a and the corrugated plate 14 are formed so as to include the function of the side beams 19 of the floor member 11a, which reduces component parts and facilitates work for fabricating the floor member 11a. Furthermore, since the portions having the function of the side beam 19 are respectively formed integrally with the upper plate 12a, the lower plate 13a and the corrugated plate 14, the floor members 11a in those modifications are advantageous with respect to the strength thereof.

Figure 10:
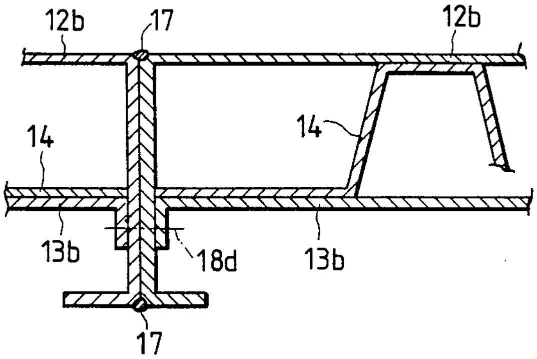

In the modification shown in FIG. 10, the opposite sides of a plate forming an upper plate 12b and having a width greater than a width of the upper plate 12a are bent vertically downward so as to form vertical portions projecting from a lower plate 13b and bent horizontally to form horizontal portions. The opposite sides of the lower plate 13b also are bent vertically downward so as to form vertical portions respectively extending in contact with the corresponding vertical portions of the upper plate 12b. The vertical portions of the upper plate 12b and the vertical portions of the lower plate 13b are spot-welded at weld spots 18d.

The horizontal portions of the upper plate **12*b* extending horizontally from the vertical portions of the same projecting below the lower plate 13*b*** are used as supporting members for supporting under-floor equipment.

Thus, the upper plate **12*b* serves both as the side beams and the supporting members for supporting equipment as well as an upper plate, which reduces the component parts of the underframe 3**. The integral construction including the upper plate, the side beams and the supporting members is advantageous in respect of strength.

Figure 11:
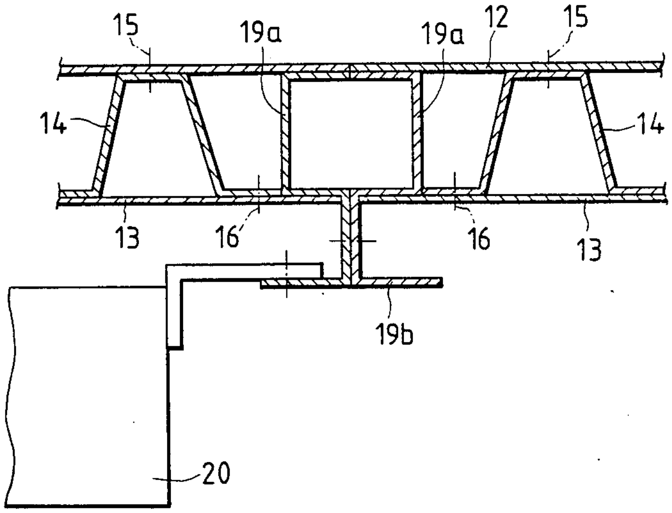

In the modification shown in FIG. 11, the edge portion of a lower flange of a side beam **19*a* having a width greater than that of the lower flange of the side beam 19*a* is bent downward to form a vertical portion projecting below a lower plate 13 and is bent further horizontally to form a horizontal flange 19*b*. Brackets attached to equipment 20 are placed on and are fastened with, for example, bolts and nuts to the horizontal flange 19*b* of the side beam 19*a***.

Thus, the employment of the side beam **19*a* integrally having the horizontal flange 19*b* for supporting necessary equipment reduces the component parts of the underframe 3 and is advantageous in respect of strength. Since the side beam 19*a* extends longitudinally of the body, in most cases, the side beam 19*a* is formed of a plate having a thickness greater than a thickness of the upper plate 12, the lower plate 13 and the corrugated plate 14, which is advantageous in forming the horizontal flange 19*b*** for supporting necessary equipment.

Figure 12:
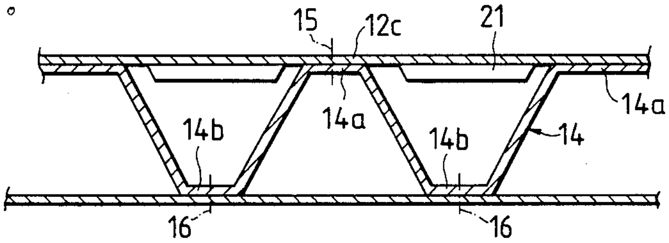
FIG. 12 is a sectional view of an underframe construction in accordance with a third embodiment of the present invention.
Figure 13:
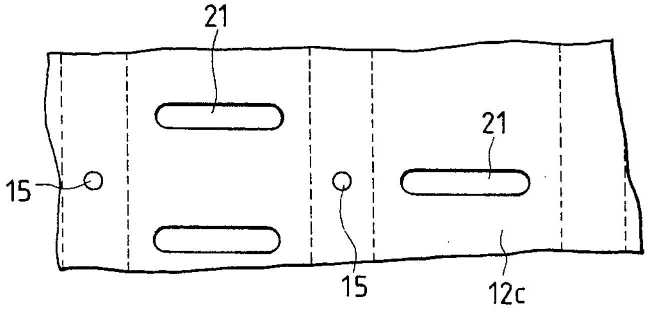
FIG. 13 is a plan view of a portion of the underframe construction of FIG. 12.
Figure 14:
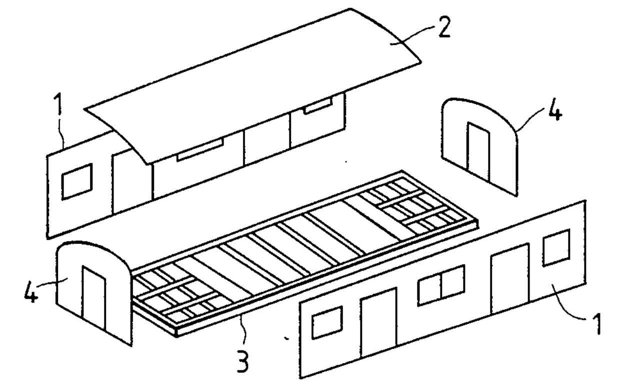
FIG. 14 is an exploded perspective view showing the members of the body of a rolling stock with a conventional underframe.
Figure 15:
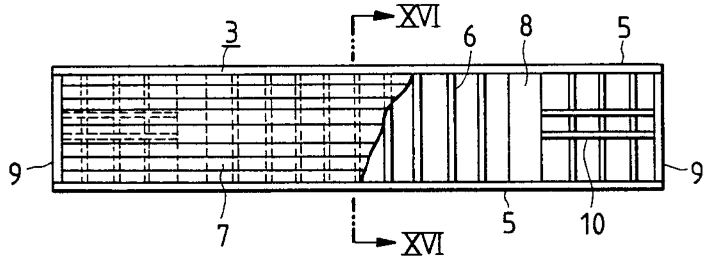
FIG. 15 is a plan view of a conventional underframe.
Figure 16:
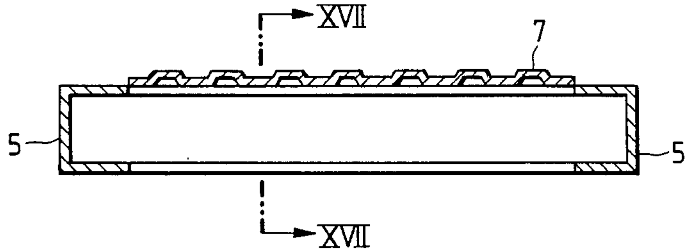
FIG. 16 is a cross sectional view taken along the line XVI—XVI in FIG. 15.
Figure 17:
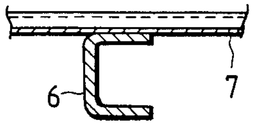
FIG. 17 is a cross sectional view taken along the line XVII—XVII in FIG. 16.

As shown in FIGS. 12 and 13, an underframe construction is provided which includes upper plate **12*c* having elongate protrusions 21 in the lower surface thereof in areas corresponding to the furrows of a corrugated plate 14. The elongated protrusions 21 extend along the width of the underframe and are not formed in areas corresponding to the upper walls 14*a* of the ridges of the corrugated plate 14. Accordingly, the elongated protrusions 21 are formed intermittently along the width of the upper plate 12*c* and are arranged longitudinally at regular intervals. The elongated protrusions 21** in an area corresponding to each furrow are shifted by half a longitudinal pitch relative to those in an area corresponding to the adjacent furrow.

When a vertical load, such as the weight of passengers or the weight of equipment, is applied to the upper plate **12*c*, a compressive stress is induced in the upper plate 12*c* and hence the upper plate 12*c* tends to buckle. The elongated protrusions 21 are formed to prevent the buckling of the upper plate 12*c***.

The elongated protrusions 21 are formed perpendicularly to the ridges of the corrugated plate 14 to prevent, together with the ridges of the corrugated plate 14, the buckling of the upper plate **12*c* attributable to longitudinal and transverse compressive stresses induced in the upper plate 12*c***.

Although the elongated protrusions 21 in the embodiment shown in FIGS. 12 and 13 are formed intermittently along the width of the upper plate **12*c* on the lower surface of the upper plate 12*c*, transverse, continuous protrusions may be formed on the upper surface of the upper plate 12*c*, which further enhances the strength of the upper plate 12*c*. That is, the transverse, continuous protrusions enhances the buckling strength of the upper plate 12*c* against a transverse compressive stress induced in the upper plate 12*c***.

We claim:

1. An underframe construction for a rolling stock, the underframe construction comprising:

longitudinally extending side sills;

end sills extending transversely of the side sills and connecting opposite ends of one side sill to corresponding opposite ends of another side sill;

body bolsters respectively disposed at positions corresponding to trucks of the rolling stock;

center sills extending between the body bolsters and the corresponding end sills in parallel to the side sills; and a floor member disposed in an area defined by the side sills and said body bolsters, said floor member comprising an upper plate, a lower plate, and a corrugated plate disposed between the upper plate and the lower plate, said corrugated plate including an alternate arrangement of ridges and furrows disposed in a transverse direction of said underframe and extending in a longitudinal direction of said underframe, and wherein said corrugated plate is fixedly joined to both the upper plate and the lower plate.

2. An underframe construction for a rolling stock according to claim 1, wherein said floor member is disposed in an area defined by the side sills and the end sills.

3. An underframe construction for a rolling stock according to claim 1, wherein each of said upper plate, lower plate and corrugated plates are divided into a plurality of plates arranged in a transverse direction of the underframe, and each of said plurality of plates are jointed.

4. An underframe construction for a rolling stock according to claim 3, wherein a plurality of upper plates, corrugated plates, and lower plates are arranged so that respective joints of said upper plates, lower plates, and corrugated plates are shifted in a direction of said underframe.

5. An underframe construction for a rolling stock, the underframe construction comprising:

longitudinally extending side sills;

end sills extending transversely of the side sills and connecting opposite ends of one side sill to corresponding opposite ends of another side sill;

body bolsters respectively disposed at positions corresponding to trucks of the rolling stock;

center sills extending between the body bolsters and the corresponding end sills in parallel to the side sills; and a floor member disposed in an area defined by the side sills and said body bolsters, said floor member comprising an upper plate, a lower plate, and a corrugated plate disposed between the upper plate and the lower plate, said corrugated plate including an alternate arrangement of longitudinal ridges and longitudinal furrows said corrugated plate is fixedly joined to both the upper plate and the lower plate, and wherein said upper plate of said floor member is provided with a plurality of transversely extending elongated protrusions.

6. An underframe construction for a rolling stock according to claim 5, wherein said elongated protrusions extending in a downward direction toward the lower plate and are positioned in the furrows of the corrugated plate.

7. An underframe construction for a rolling stock according to claim 5, wherein the plurality of transversely extending elongated protrusions are continuous protrusions and are provided on an upper surface of the upper plate of said floor member.

8. An underframe construction for a rolling stock, the underframe construction comprising:

longitudinally extending side sills;

end sills extending transversely of and connecting opposite ends of one side sill to corresponding opposite ends of another side sill;

body bolsters respectively disposed at positions corresponding to trucks of the rolling stock;

center sills extending between the end sills and the corresponding body bolsters in parallel to the side sills;

a floor member disposed in an area defined by the side sills and the end sills;

supporting members extending downwardly from a lower surface of the floor member to support equipment; and wherein said floor member comprises an upper plate forming an upper surface of the floor member, a lower plate forming a lower surface of the floor member, and a corrugated plate disposed between the upper plate and the lower plate, said corrugated plate has an alternate arrangement of ridges and furrows disposed transversely of the underframe and extending in a longitudinal direction thereof, said corrugated plate is fixedly joined to both the upper plate and the lower plate, and wherein the supporting members are disposed on the lower surface of the lower plate respectively at positions corresponding to webs of the corrugated plate support under-floor equipment.

9. An underframe construction for a rolling stock, the underframe construction comprising:

longitudinally extending side sills;

end sills extending transversely of the side sills for connecting opposite ends of one side sill to corresponding opposite ends of another side sill;

body bolsters respectively disposed at positions corresponding to trucks of the rolling stock;

center sills extending between said body bolsters and the corresponding end sills in parallel to the side sills;

a floor member disposed in an area defined by the side sills and said body bolsters, said floor means is divided into a plurality of floor members disposed transversely of the underframe, each of said floor members comprising an upper plate forming an upper surface of the floor members, a lower plate forming a lower surface of the floor member, a corrugated plate disposed between the upper plate and the lower plate, and side beams respectively disposed on opposite sides of the corrugated plate, wherein said side beams are channel-shaped and extend longitudinally of said underframe, said corrugated plate includes an alternate arrangement of ridges and furrows disposed transversely of the underframe and extending in a longitudinal direction thereof, said corrugated plate and the side beams are fixedly joined to both the upper plate and the lower plate, and each of said floor members is contiguously joined in a transverse direction of the underframe.

10. An underframe construction for a rolling stock, according to claim 9, wherein said side beams are integrally formed with the corrugated plate of said floor block by bending opposite side portions of a plate forming the corrugated plate.

11. An underframe construction for a rolling stock, according to claim 9, wherein said side beams are integrally formed with the upper plate of said floor block by bending opposite side portions of a plate forming the upper plate.

12. An underframe construction for a rolling stock, according to claim 9, wherein said side beams are integrally formed with the lower plate of said floor block by bending opposite side portions of a plate forming the lower plate.

13. An underframe construction for a rolling stock, according to claim 9, wherein side portions of at least one of a plate forming the upper plate, the corrugated plate, the lower plate or the side beams are bent to form supporting members for supporting equipment.

14. A method of manufacturing an underframe construction for a rolling stock, the method comprising the steps of:

assembling longitudinally extending side sills, end sills for connecting opposite ends of one side sill to corresponding opposite ends of another side sill, body bolsters to be respectively disposed at positions corresponding to trucks of the rolling stock, and center sills to be extended between the end sills and the corresponding body bolsters in parallel to the side sills for constructing an underframe;

placing a floor member comprising an upper plate, a lower plate and a corrugated plate having alternating ridges and furrows disposed transversely of the underframe and extending in a longitudinal direction thereof in an area defined by the side sills and the body bolsters;

fixedly joining respective side edges of the floor member to the side sills; and fixedly joining respective opposite longitudinal ends of the floor member to the body bolsters.

15. A method for manufacturing an underframe construction for a rolling stock, according to claim 14, wherein an assembly of the lower plate and the corrugated plate is placed in the area defined by the side sills and the body bolsters, the lower plate and the corrugated plate are fixedly joined to the side sills and the body bolsters, and the upper plate is placed on and fixedly joined to the corrugated plate, and then the upper plate is fixedly joined to the side sills and the body bolsters.

16. A method of manufacturing an underframe construction for a rolling stock, according to claim 14, wherein an assembly of the upper plate and the corrugated plate is placed in the area defined by the side sills and the body bolsters, the upper plate and the corrugated plate are fixedly joined to the side sills and the body bolsters, the lower plate is placed on and fixedly joined to the corrugated plate, and then the upper plate is fixedly joined to the side sills and the body bolsters.

17. An underframe construction according to claim 5, wherein the elongated protrusions in adjacent furrows are shifted by half an longitudinal pitch.

18. An underframe construction according to claim 5, wherein the elongated protrusions are formed perpendicularly to ridges of the corrugated plate.

19. An underframe construction for a rolling stock, the underframe construction comprising:

longitudinally extending side sills;

end sills extending transversely of the side sills and connecting opposite ends of one side sill to corresponding opposite ends of another side sill;

body bolsters respectively disposed at positions corresponding to trucks of the rolling stock;

center sills extending between the body bolsters and the corresponding end sills in parallel to the side sills; and a floor disposed in an area defined by the side sills and said body bolsters, said floor is a sectional floor including a plurality of floor members arranged transversely of the floor, each floor member comprising an upper plate, a lower plate and a corrugated plate disposed between the upper plate and the lower plate, said corrugated plate including an alternate arrangement of longitudinal ridges and longitudinal furrows, said corrugated plate is fixedly joined to both the upper plate and the lower plate, and wherein each floor member is provided with channel-shaped side beams at opposite sides of the corrugated plate, said channel-shaped side beams extending longitudinally of the underframe construction and including web means, and web means of adjacent side beams are spot welded to each other with upper and lower portions of each of the side beams being respectively welded to the upper and lower plates.

* * * * *